(12) United States Patent
Fitter

(10) Patent No.: US 6,899,978 B2
(45) Date of Patent: *May 31, 2005

(54) ELECTROCHEMICAL CELL

(76) Inventor: Johan Christiaan Fitter, 51 Mount Street, Bryanston, 2021, Gauteng (ZA)

(*) Notice: Subject to any disclaimer, the term of this patent is extended or adjusted under 35 U.S.C. 154(b) by 23 days.

This patent is subject to a terminal disclaimer.

(21) Appl. No.: 09/739,483

(22) Filed: Dec. 18, 2000

(65) Prior Publication Data

US 2002/0102467 A1 Aug. 1, 2002

(51) Int. Cl.$^7$ ............................................. H01M 10/08
(52) U.S. Cl. ........................ 429/347; 429/57; 429/188; 429/199; 429/204
(58) Field of Search ........................... 429/50, 57, 188, 429/199, 204, 347

(56) References Cited

U.S. PATENT DOCUMENTS

| | | | |
|---|---|---|---|
| 3,660,127 A | | 5/1972 | Rampel |
| 3,811,946 A | * | 5/1974 | Creutz et al. ............... 429/101 |
| 3,877,993 A | | 4/1975 | Davis |
| 3,928,066 A | | 12/1975 | Lewenstein |
| 3,945,849 A | | 3/1976 | Hoffman |
| 3,953,242 A | * | 4/1976 | Hoffman ..................... 429/201 |
| 4,064,324 A | | 12/1977 | Eustace |
| 4,182,797 A | | 1/1980 | Kondo et al. |
| 4,377,625 A | * | 3/1983 | Parsen et al. .............. 29/623.1 |
| 5,582,934 A | * | 12/1996 | Steinbrecher ............... 429/204 |
| 5,660,947 A | | 8/1997 | Wuhr |
| 6,132,901 A | * | 10/2000 | Clough ....................... 429/215 |
| 2002/0038765 A1 | * | 4/2002 | Fitter ......................... 205/302 |

FOREIGN PATENT DOCUMENTS

| | | | | |
|---|---|---|---|---|
| FR | 2 236 283 | | 1/1975 | |
| GB | 1 569 397 | | 6/1980 | |
| JP | 50091728 A | | 7/1975 | |
| JP | 55 062 661 A | * | 5/1980 | ................ 429/347 |
| JP | 85012744 B | | 4/1985 | |
| JP | 61 080 758 A | * | 4/1986 | |
| JP | 61 240 573 A | * | 10/1986 | |
| JP | 01267956 A | * | 10/1989 | ............ H01M/4/26 |
| JP | 11080326 A | | 3/1990 | |
| JP | 11100347 A | | 4/1990 | |
| JP | 8306365 A | | 11/1996 | |
| JP | 10149839 A | | 6/1998 | |
| JP | 10 302 785 A | * | 11/1998 | |
| WO | WO 99/30379 A1 | | 6/1999 | |

* cited by examiner

Primary Examiner—Gregg Cantelmo
(74) Attorney, Agent, or Firm—William J. Sapone; Coleman Sudol Sapone PC

(57) ABSTRACT

An electrochemical cell having a positive electrode, a negative electrode and an electrolyte is dosed with an additive which acts on the negative electrode to reduce electrolysis and, hence, water consumption of the cell during the course of operation of the cell, in particular when the cell is in a state of overcharge. The additive is arranged to reduce the flow of current between the electrodes when a potential ordinarily sufficient to cause electrolysis of the electrolyte is applied across the electrodes. The additive typically coats the negative electrode to form a barrier in conjunction with gas bubbles evolving from the negative electrode in order to reduce the flow of current to the electrode and/or a reduction in the flow of ions to the negative electrode and/or gas bubbles flowing from the negative electrode.

20 Claims, 5 Drawing Sheets

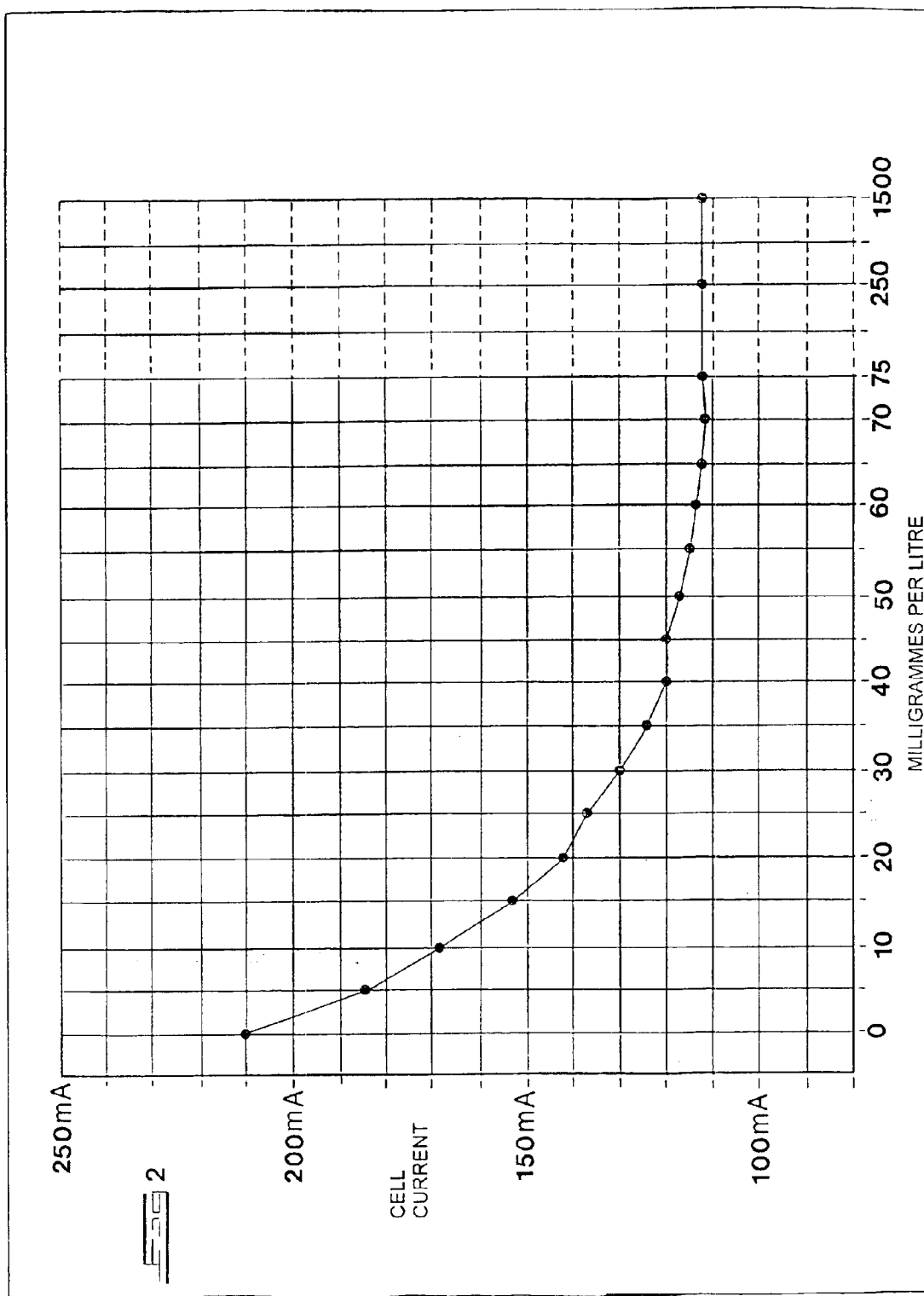

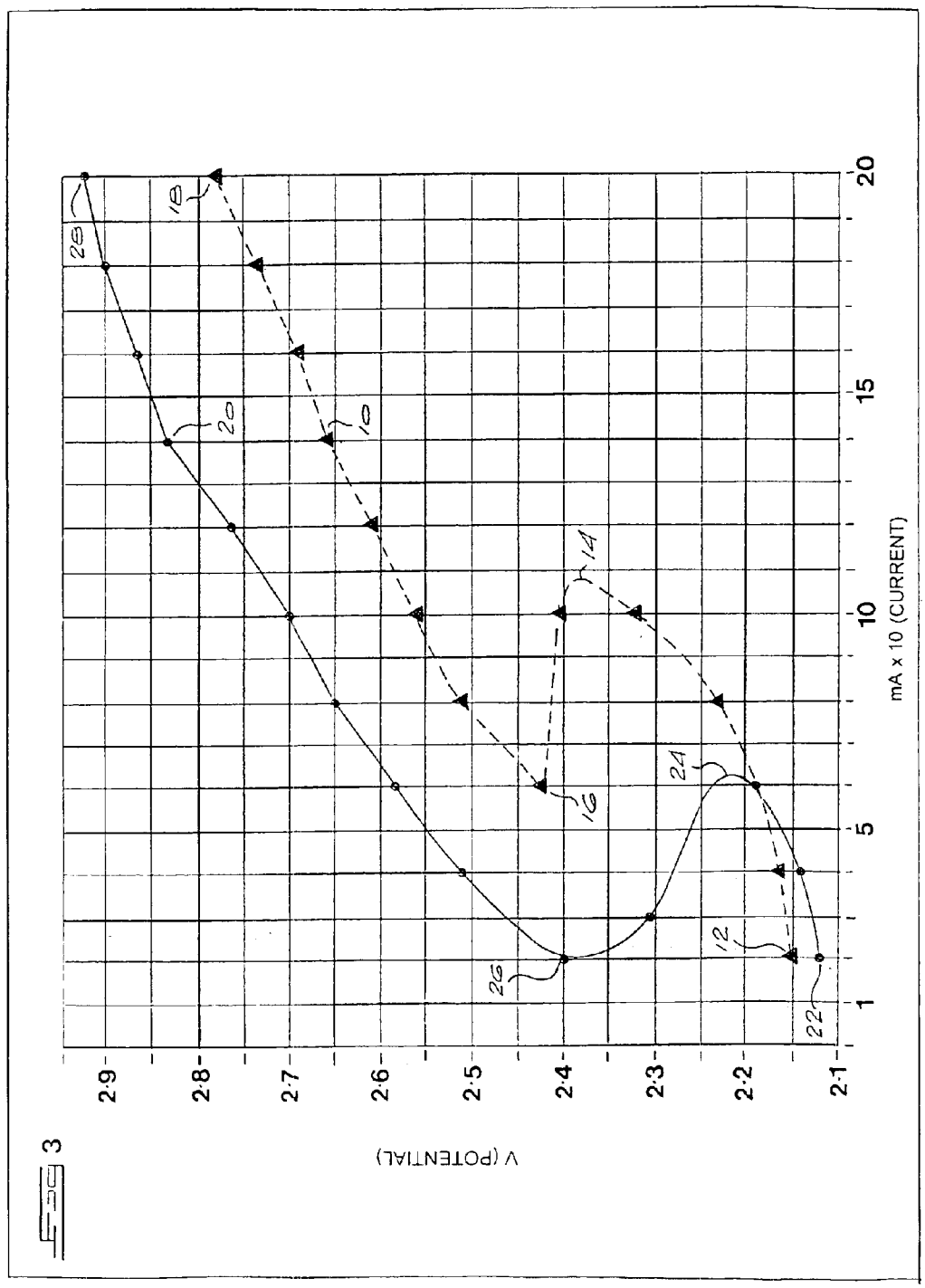

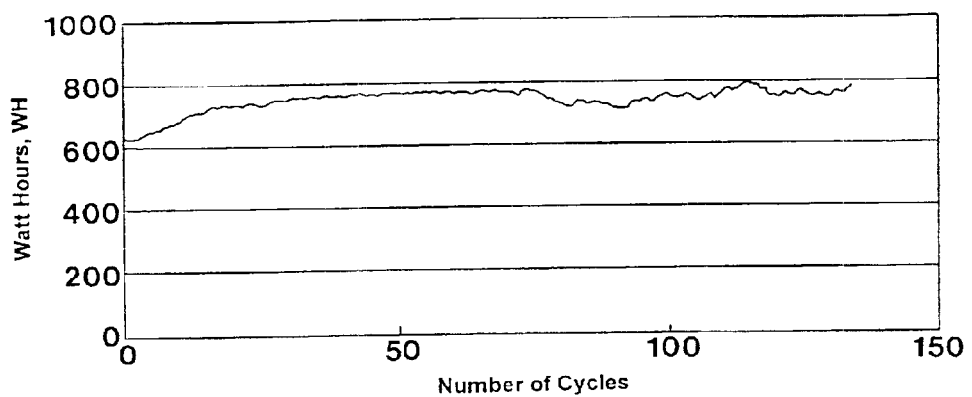
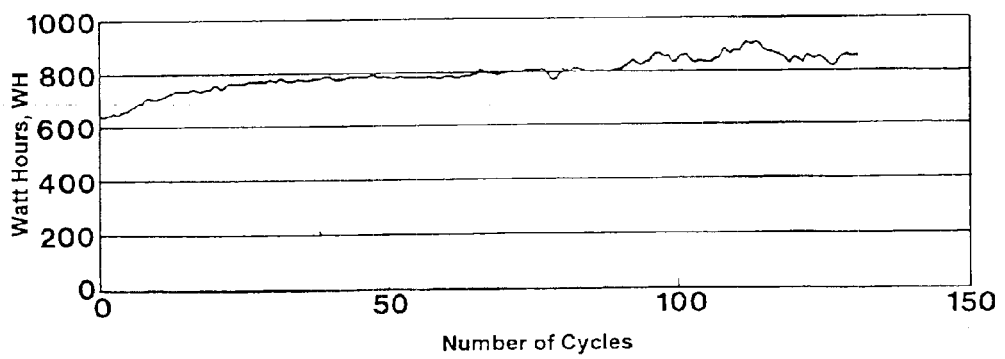

ELECTROCHEMICAL CELL

BACKGROUND OF THE INVENTION

THIS invention relates to an electrochemical cell, in particular a lead-acid battery cell, and to an additive for reducing water loss thereof.

A problem inherent in lead-acid battery cell usage is that it is difficult to provide a charging current having a magnitude that exactly matches the requirement of the cell. It is, therefore, customary to apply a degree of overcharging to ensure that the cell is not inadvertently short charged. It is known that such overcharging causes electrolysis, and consequently, that this leads to a loss of water from the electrolyte.

It is usual for the electrolyte to contain between 30% and 40% of sulphuric acid, by weight, in water, when the cell is in a full state of charge, and roughly half this concentration of acid when the cell is depleted.

At full state of charge of the cell the negative electrode includes an active portion of lead and the positive electrodes includes an active portion of lead dioxide.

Upon discharge, the active portion of lead in the negative electrode and the active portion of lead dioxide in the positive electrode are each converted to lead sulphate.

The relevant reactions come into effect when the electrical circuit connected to the cell is completed and an electric current is permitted to flow therein. The cell is recharged simply by causing the current in the circuit to reverse, thereby causing the reactions to be reversed. The reactions will slow down as the cell becomes fully charged, and cease upon attainment of a full state of charge.

The customary overcharged which ensues is made as small as possible within practical limitations, and especially so in the case of sealed batteries where the avoidance of water loss is even more important. However, once the reactions between the electrolyte and the electrodes have finally ceased, the current being applied to the cell electrolyses the water portion of the electrolyte into its primary constituents, hydrogen gas at the negative electrode and oxygen gas at the positive electrode, effecting a loss of water. The functional chemistry of the electrodes is substantially unaffected by this process of electrolysis, which affects principally the electrolyte through decomposition.

U.S. Pat. No. 3,928,066 to Lewenstein discloses a rechargeable lead acid storage battery incorporated a quaternary ammonium compound wherein aromatic and/or aliphatic groups have been substituted for all the hydrogen atoms for the purpose of suppressing hydrogen evolution and thereby inhibiting water loss.

A disadvantage of the Lewenstein invention is that it is limited to providing suppression of gas evolution passively through minimising the latent chemical reactions between the electrolyte and antimony-to-lead couples existing in one of the electrodes, also known as local action, and does not provide for suppression of gas evolution caused by electrical stimulation provided by an external circuit.

Another disadvantage is that quaternary ammonium compounds have a limited life in a lead-acid battery even if the cell remains unused. A dosage, whether 200 ppm or 2 percent in concentration initially, can fall to near zero within a few weeks, and consequently provide the claimed benefit for perhaps less than ten percent of the service life of the cell.

It is an object of the present invention to overcome these and other disadvantages by providing means for suppressing the evolution of gas from an electrochemical cell while an electrode of the cell is in a state of charge, particularly in a so-called "overcharged" state.

SUMMARY OF THE INVENTION

An electrochemical cell of the invention comprises opposed positive and negative electrodes, an aqueous electrolyte in ionic contact with the electrodes and a current reducing additive in ionic contact with the electrolyte and the electrodes, the current reducing additive being capable of reducing the flow of current between the electrodes when a potential ordinarily sufficient to cause electrolysis of the electrolyte is applied across the electrode, thereby to reduce the amount of electrolysis of the electrolyte.

By "potential ordinarily sufficient to cause electrolysis" is meant a potential which, in the absence of the additive, will cause electrolysis i.e. an overpotential. Thus, there is a potential threshold above which electrolysis take place in the absence of the additive of the invention and below which little or no electrolysis takes place.

The invention extends to a method of reducing water loss in an electrochemical cell, in particular a battery such as a lead acid battery, including the step of introducing a current additive into the electrolyte of the cell to reduce the current between the electrodes of the cell when a potential ordinarily sufficient to cause electrolysis of the electrolyte is applied across the electrodes, thereby to reduce gas evolution at the electrodes and, consequently, water loss.

The invention also extends to an electrochemical cell comprising opposed positive and negative electrodes, an aqueous electrolyte in ionic contact with the electrodes and a current reducing additive in ionic contact with the electrolyte and the electrodes, the current reducing additive being arranged to adhere or adsorb to the negative electrode and to form an impediment or barrier over a surface of the negative electrode when a potential ordinarily sufficient to cause electrolysis of the electrolyte is applied across the electrodes, the barrier or impediment providing a reduction in the flow of current to the electrode and/or a reduction in the flow of ions to the negative electrode and/or gas bubbles from the negative electrode, thereby reducing the amount of electrolysis.

BRIEF DESCRIPTION OF THE ACCOMPANYING DRAWINGS

The invention will now be described in more detail, by way of example only, with reference to the accompanying drawings in which:

FIG. 2 shows a graphical representation illustrating the current dependency of an electrochemical cell on th concentration of an additive of the invention;

FIG. 3 shows a graphical representation illustrating the comparative current dependency of an electrochemical cell without an additive or the invention and a cell with an additive of the invention on the supply voltage to the cell;

FIG. 4 shows a graphical representation illustrating the performance of a golf-cart battery without an additive of the invention;

FIG. 5 shows a graphical representation illustrating the performance of a golf-cart with an additive of the invention.

DETAILED DESCRIPTION OF PREFERRED EMBODIMENT(S)

Figure 1:
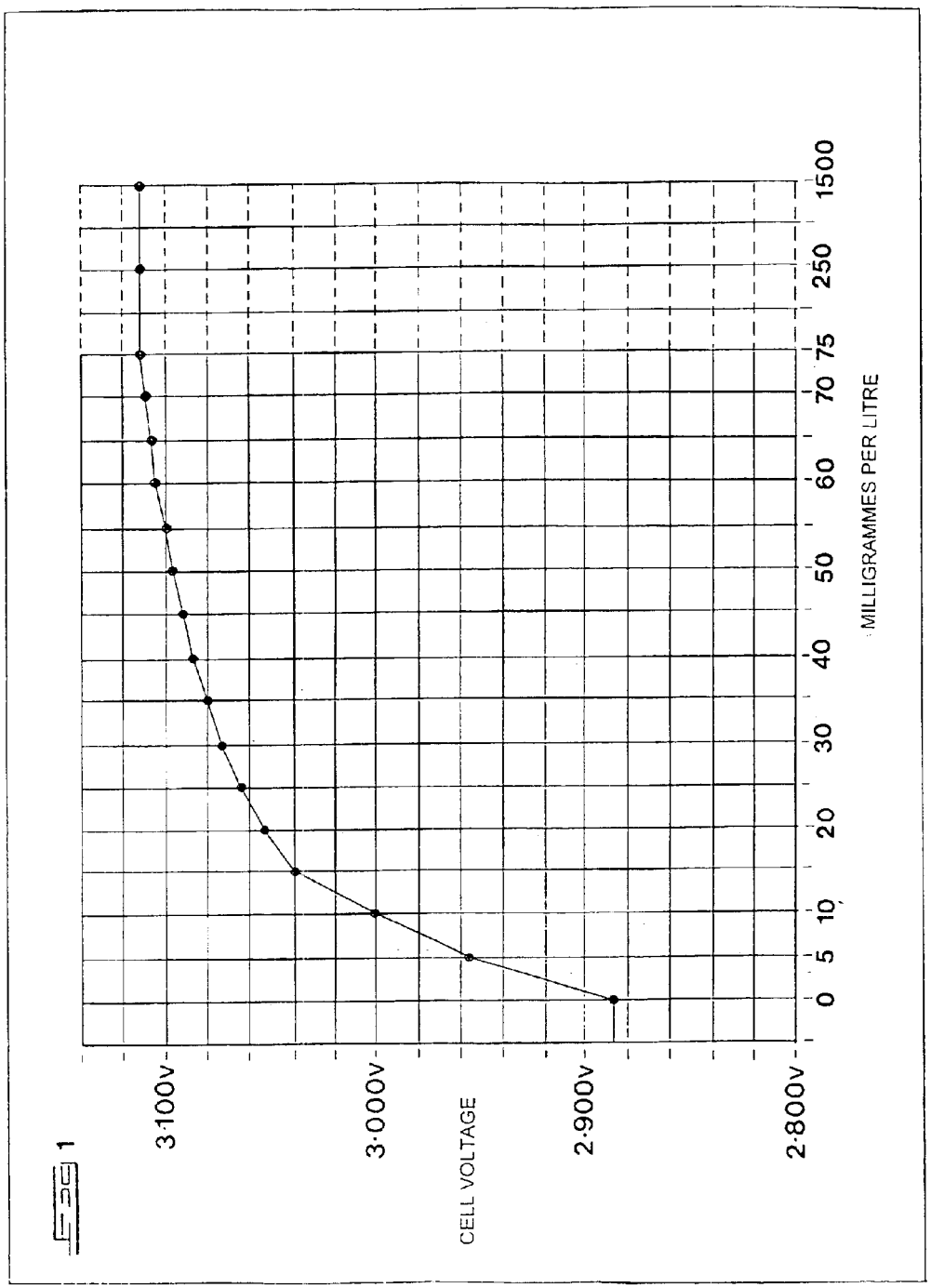
FIG. 1 shows a graphical representation illustrating the voltage dependency of an electrochemical cell on the concentration of an additive of the invention.

According to the invention, a battery cell having a positive electrode, a negative electrode and an electrolyte is dosed with an additive which acts on the negative electrode to reduce water consumption of the cell during the course of operation of the cell, in particular when the cell is in a state of overcharged.

An n-alkyl dimethyl benzyl ammonium chloride having 12 to 16 carbon atoms in its alkyl substituent has been found to be particularly useful as an additive of the invention. Other useful compounds include didecyl dimethyl ammonium chloride, didecyl methyl oxyethyl ammonium propionate, as well as a wide range of other quaternary ammonium compounds including pyridine and quinoline. Non ionics including primary, secondary and tertiary amines are also effective, but less so. Anionics including sodium dioctyl sulpho succinate have also been found to work, but only in the presence of suitable cations.

For the purpose of describing the effect of an additive of the invention, reference will be made to a lead-acid battery cell.

The positive electrode thereof has an active component of lead-dioxide in contact with the electrolyte and the negative electrode has an active component of lead in contact with the electrolyte, when the cell is in a charged condition. The electrolyte typically consists of water and sulphuric acid, the sulphuric acid conventionally comprising on third of the electrolyte, by weight, when the cell is in a charged condition. The electrodes conveniently include support members which are usually made of lead and lead alloy.

The electrodes of a lead-acid battery are preferably formed as grids, and have the respective active components of lead and lead dioxide impressed or pasted into the grid apertures. The positive electrode may, optionally, be formed into an array of tubes. A metallic core is typically located within each tube and surrounded by an active component such as lead-dioxide and contained within a porous tube-like structure. The electrodes may, optionally, be formed out of sheet or foil, which may, or may not be subjected to mechanical processing prior to incorporation into the cell construction.

The electrodes commonly include material other than the active components of lead and lead dioxide, in combination with the active materials, so as to improve their performance in use and to prolong their useful life. Upon discharge, the lead dioxide of the positive electrode is progressively converted into lead sulphate, and the lead of the negative electrode is progressively converted into lead sulphate. This process is, of course, reversed upon recharging.

The electrolyte is typically free flowing. It may, optionally, be combined with a carrier to prevent it form flowing freely. In this way it may be suspended or immobilised. Furthermore, the electrolyte may, optionally, contain agents to assist in transportation of constituents relating to the normal chemical reactions between the positive electrode, the negative electrode and the electrolyte. The electrolyte may be gelled or may be suspended by surface tension.

Conventional battery cells are usually equipped with sheets of separator material including, for example, porous executions of wood, cellulose, paper, rubber, fibreglass, fibreplastic, polyethylene, polypropylene, polyvinylchlorine, as well as combinations of the aforelisted and combinations thereof with silica, as well as other suitable substances.

The separators are intended to maintain the electrodes physically apart and to facilitate contact between the electrodes only through the medium of the intervening portion of the electrolyte.

Conventional battery cells are also usually equipped with electrodes having active materials therein in combination with expanders and fillers, which combination is intended to improve the mechanical properties of the electrodes, for example, during their construction and during their service life in application. These additional substances include, for example, carbon black, barium sulphate and a wide variety of wood extracts as well as processed substances.

Significantly, some manufacturers of separation and expander-filler materials for use in batteries have claimed that their products have capacity to impart a reduction in water consumption and an extension to the service life of the batteries incorporating them without these claims having been substantiated.

In charging a battery, a conventional battery charger and requisite circuitry are used. Such a battery charger may include at least one transformer, a rectifier and a current controlling device to limit the current supplied by the battery charger. It may further include a ferro-resonant regulator, thyristor regulator or inverter regulator. The battery charger typically includes a series regulator for the control of output potential and also for the control of output current.

The battery charger is advantageously equipped with electronic regulating circuitry capable of maintaining the delivery of a potential and of a current very close to their selected values, such delivery sometimes being termed constant potential and constant current, respectively.

In the operation of charging a battery, it is preferable to select a zero current and a zero voltage setting prior to commencement of operation of the battery charger. If it is desired to provide the cell with charging energy at a constant potential, first the maximum desired current is selected. Thereafter the desired potential is selected and the selected potential applied to the cell. The current which flows as consequence of the selection and application of the potential may lie between a zero value and a value corresponding to the maximum desired current.

If it is desired to prove the cell with charging energy at a constant current, the maximum desired potential is selected. Thereafter the desired current is selected and begins to flow in the circuit. The potential which appears across the terminals of the cell as a consequence of the selection and application of the current may lie between a zero value and a value corresponding to the maximum desired potential. Although a zero potential may appear, this is unlikely in the normal course of events since the lead-acid battery cell will normally be contributing a potential due to a finite charge therein.

In order to show the consequence of containing the electrolyte with an additive of the invention, in this case an n-alkyl dimethyl benzyl ammonium chloride additive, the following non-limiting examples were carried out.

EXAMPLE 1

A lead-acid battery cell was assembled with a positive electrode having an active component of lead dioxide in contact with the electrolyte and a negative electrode made of pure lead foil having a portion of lead in contact with the electrolyte. The electrolyte was procured from a suitable source of battery acid having a specific gravity of 1.260.

The material chosen for the negative electrode provided a comparatively small reactive material area and thereby added sensitivity to the test, which a conventional pasted electrode would not have provided.

The negative electrode was placed in contact with the battery acid of 1.260 SG for two days prior to incorporation into the lead-acid battery test cell.

The cell was subjected to a current of 150 mA until the electrodes began to emit gas bubbles. The current was turned off, and a small incandescent lamp rated at 2 V and 150 mA was connected across the cell's terminals, causing it to light up briefly.

Thereafter the cell was again subjected to a current of 150 mA until the electrodes emitted gas bubbles.

A dispensing dropper was calibrated using a solution of n-alkyl dimethyl benzyl ammonium chloride to dispense a quantity per drop calculated to provide an increment of 5 mg/l by weight, of the n-alkyl dimethyl benzyl ammonium chloride in the electrolyte.

FIG. 1 shows a graph representing the potential across the electrodes of the cell against the n-alkyl additive concentration, in milligrammes per litre, with increments of 5 mg/l at 10 minute intervals up to 75 mg/l, at a steady current of 150 mA throughout. Thereafter the quantities dispensed were increased to provide 250 mg/l and 1 500 mg/l concentrations in the electrolyte at intervals of one hour. The temperature of the electrolyte remained between 19.1 and 20.8° C. throughout the test.

The graph appeared to confirm that the potential across the electrodes of a lead-free battery cell increase significantly upon addition of n-alkyl dimethyl benzyl ammonium chloride, even at a concentration as little as 5 mg/l, leveling out at about 75 mg/l, and remaining relatively constant up to 1 500 mg/l providing the current flowing in a circuit including the cell is maintained at a constant level.

However, the current through the cell was maintained constant at a value of 150 mA throughout the test. Therefore, if there should be a change in the impedance of the cell, by way of example, this would also be reflected as a corresponding change in the potential across the cell.

EXAMPLE 2

Thus a second test was conducted on another cell of the same page type, and under the same conditions, except that instead of maintained the current through the cell constant, the potential across the cell was maintained constant. The variation in current against increasing dosage concentration was recorded.

FIG. 2 shows a graph representing the current through the cell against the n-alkyl dimethyl benzyl ammonium chloride concentration, in milligrammes per litre, with increments of 5 mg/l at 10 minute intervals up to 75 mg/l, at a steady 3,000 volts throughout. The quantities dispensed thereafter were increased to 250 and 1 500 mg/l, as before. The temperature of the cell remained between 24.6 and 23.4° C. throughout the test.

The graph confirms that the current fell significantly upon addition of n-alkyl dimethyl benzyl ammonium chloride, even at a concentration of 5 mg/l, leveling out at approximately a half of the starting current.

Although the two graphs of FIGS. 1 and 2 are not an exact match at the 3,000 V and 150 mA points, they are deemed close enough to confirm the existence of an impediment, which causes a reduction in current rather than an increased in potential.

EXAMPLE 3

Two cells of identical type to the cell in Examples 1 were assembled. The electrolyte was procured from the same source of battery acid having a specific gravity of 1.260.

The two cells were each in turn subjected to a current of 150 mA and the procedure for producing gas bubbles and connecting the incandescent lamp, followed by repeat gassing, as per Example 1, was applied.

Thereafter the first cell received a dosage of n-alkyl dimethyl benzyl ammonium chloride in a single application to provide a concentration in its electrolyte of 50 mg/l, while the second cell received no dosage. Both cells were subjected to a current of 150 mA following the dosing.

After intervals of 15 minutes of current, the potential across the electrodes of the second cell closely resembled the potential represented in the graph of FIG. 1 at 0 mg/l, and the potential across the electrodes of the first cell Resembled the potential represented at 50 mg/l.

After each cell had been subjected to its individual initial sequence, the second cell was readied for operation, but the current was not applied. The second cell negative electrode was removed form the second cell, and discarded, while the first cell negative electrode was removed from the first cell. The portion of this electrode that has been submerged in the electrolyte was carefully protected against contact by any solid objects. The first cell negative electrode was then carefully washed under cold running water for one minute, and allowed to dry be evaporation in a dry atmosphere at 20° C.

The first cell negative electrode was deemed dry after 30 minutes and it was incorporated into the second cell to replace the original negative electrode that had been removed and discarded. Thereafter, the second cell was subjected to a current of 150 mA until the electrodes emitted gas bubbles.

Then, after 30 minutes, a potential measurement was taken. The potential across the electrodes resembled the potential represented in the graph by 34 mg/l, suggesting that the dosage of n-alkyl dimethyl benzyl ammonium chloride that had been applied to the first cell, but not the second cell, had provided the negative electrode with a property of increasing the cell potential at a fixed current, which property is transferable. The sight reduction in equivalent mg/l suggest either an error in measurement, or a small wasting of the property.

EXAMPLE 4

A lead-acid battery cell was assembled with a positive electrode having an active component of lead dioxide and a negative electrode comprising a conventional grid-like structure and pasted active material therein. An electrolyte having a specific gravity of 1.260 was procured.

The material chosen for the negative electrode was selected from a portion of a conventional lead-acid battery of a type commonly used to power golf-carts. The material chosen for the positive electrode was similarly selected.

Both electrodes were placed in contact with the electrolyte for a period of two days while a current varying between 1 mA and 1.0 A was allowed to pass between them. Thereafter the electrolyte was discarded.

Subsequently, a replacement electrolyte was applied, per Example 1, and the cell was subjected to a current of 150 mA until the electrodes both emitted gas bubbles, and the potential across the terminals had risen to an upper potential limit of 2.6 V, whereupon the current was permitted to stabilise while the potential was maintained, for a period two hours.

Thereafter the current was turned off, and the incandescent lamp was applied, per Example 1, until the potential across the terminals had fallen to a value of 1.5 V.

Following this procedure, the cell was again subjected to a current for a second cycle, until the potential had risen to 2.6 V, in the same way as before. The lamp was applied again, as before.

On the third cycle, the current was applied, as before, and allowed to stabilise, as before. Thereafter the current was turned off for a period of 12 hours.

FIG. 3 depicts a graph representing the voltage and current interactions of the cell on being subjected to the next procedure, following the 12 hour rest period.

The current regulator was set to 250 mA, and the voltage regulator was turned up progressively in increments read off at 20 mA, in order to control the current.

With reference to FIG. 3, as expected the increments initially produced a rise in current, as depicted on curve 10 form section 12 to 14. The ammeter, however began falling rapidly when an attempt was made to increase the current beyond 100 mA. Further attempts at increases were halted until the current stabilised setting at 60 mA.

Progress beyond 16 proceeded with current and voltage rising to point 18, on the curve 10.

It was noted that the cell produced very little gassing during the initial section, from 12 to 14, but as the ammeter reading began to fall beyond point 14, and was reaching towards point 16, the negative electrode began emitting gas.

At this point a reference electrode was introduced into the cell. The reference electrode was constructed out of pure lead foil, and was soaked in electrolyte corresponding to battery acid procured from a suitable source and having a specific gravity of 1.260.

Upon introduction of the reference electrode, an electrical connection was briefly made between the terminal of the negative electrode and that of the reference electrode. Thereafter a voltmeter having an input impedance of $10^{10}$ ohms was connected across these terminals. The voltage regulator was restored to zero, and a period of waiting ensured until the voltmeter reading had fallen to zero. (plus-minus 1 mV). Thereafter the previous run was repeated, and it was noted that the potential across the terminals of the negative electrode and reference electrode presented the same deviation or inflection as before. An electrical connection was again briefly made between the terminals of the negative and reference electrodes, and the voltmeter was then reconnected across the terminals of the positive electrode and the reference electrode. The voltage regulator was restored to zero, and following the same period of waiting, the run was again repeated. This time the potential across the connected terminals did not present any significant deviation or infection, and the reference electrode, was withdrawn form the cell.

Thereafter the cell received a dosage of n-alkyl dimethyl benzyl ammonium chloride in a single application to provide a concentration in its electrolyte of 50 mg/l, and the second cycle was repeated. This second cycle included a current being applied at 150 mA until the cell was gassing and the potential across the cell had risen to 2.6 V, followed by stabilisation for a period of two hours. This was followed by application of the incandescent lamp as before.

Significantly, the recharging and discharging periods constituting the second cycle including the additive were almost identical in duration to the recharging and discharging period constituting the second cycle without the additive.

Thereafter the current was turned off for a period of 12 hours. The third cycle was repeated again, and again the current was turned off for a period of 12 hours.

The entire procedure, from the moment the current regulator was first set to 250 mA and the voltage regulator turned up progressively to control the current, was repeated.

The initial potential across the terminals of the positive and negative electrodes appeared lower at 20 and at 40 mA, but thereafter increased more rapidly, as shown on curve 20 from section 22 to 24. When an attempt was made to increase the current beyond 60 mA the ammeter again began falling, and further increases were halted until the current stabilised. Then, when the current had appeared to have stabilised the voltage control was increased, but it soon became apparent that the current was falling still further. Eventually it stabilised at 20 mA, as shown from section 24 to 26. Progress beyond 26 towards 28 appeared to proceed as before, but at elevated potential with respect to the first run.

It was again noted that the cell produced very little gassing during the initial section, from 22 to 24, but as the ammeter reading began to fall beyond point 24, as was reaching towards point 26, the negative electrode again began emitting gas.

The tests with the reference electrode were repeated, and as before the deviation or inflection was witnessed between the reference electrode and the negative electrode, but there was no significant deviation or inflection between the reference electrode and the positive electrode.

The graph confirms that inflection provide readily identifiable markers of a boundary between a mode of operation of a lead-acid battery cell which provides little or no gassing, and a mode of operation which provides significant gassing.

Importantly, the graph confirms that at a given cell potential, above the gassing point of the cell, the current in the cell is reduced to approximately a half by a presence of n-alkyl dimethyl benzyl ammonium chloride at a concentration in the electrolyte of the cell of 50 mg/l. Significantly, there must be an application of energy, in other words, the cell must be undergoing charging to achieve this reduction in current.

A preliminary test confirmed that a lead-acid battery cell will exhibit a reduced inflection, or no inflection at all if it has received insufficient charge. It may be inferred that a pronounced inflection on a rising potential implies a uniformity of the chemical condition of the electrodes as presented to the electrolyte, and in particular the negative of the cell in respect of the electrolyte. Therefore, the inflections, depicted on the graph of FIG. 3, imply a completion of the charging reactions of the battery cell as the inflections commence, followed by electrolysis of the water portion of the electrolyte as the potential across the cell is increased further.

By interpretation, according to Faraday's first law, the rate of gas being liberated through electrolysis will be directly proportional to the magnitude of the current applied to the cell. As such, the reduction in current provided by the addition of n-alkyl benzyl ammonium chloride results in a proportional reduction of gas evolution in the cell, and as consequences, provides a reduction in the loss of water from the electrolyte of the cell.

The quantity of gas liberated at a negative electrode of a lead-acid battery cell undergoing charging at a potential above a well established inflection may be estimated simply from a determination of the magnitude of the current as well as the duration of the current.

By way of example, assuming a current of 150 mA for 2 hours, and the liberation at the negative of hydrogen gas, the mass of liberated gas will be $$\frac{\text{Current (A)} \times \text{time (s)}}{\text{Faraday constant}} \times \frac{\text{gramme atomic weight}}{\text{valency}}$$

$$\frac{0.15 \times 7\,200}{96\,494} \times \frac{1.008}{1}$$

$$= 0.01128 \text{ grammes, equating to } 125 \text{ ml at N.T.P}$$

The following is provided as an explanation of the process that takes place when an additive of the invention is included in a battery undergoing charging in particular overcharging.

The results obtained in the aforegoing examples provide confirmation of a significant effect on the negative electrode by an addition of a minute quantity of n-alkyl dimethyl benzyl ammonium chloride to the electrolyte of the cell. Example 2, in particular, confirms that addition provides a remarkably resilient coating on the surface of the negative electrode, one which resists attempts at dissolving it in water. Varying orientations of the negative electrode within the cell provide the same results, implying that the coating is uniform. Increasing concentration initially appears to provide a corresponding increase in the density of the coating, reaching saturation at around 50 to 100 mg/l.

The degrees of permanence of the coating implies that a form of bonding occurs between an active constituent of the additive and the surface of the electrode. Indeed, this is entirely feasible since the n-alkyl dimethyl benzyl ammonium chloride ionizes readily, allowing the n-alkyl dimethyl benzyl ammonium cation to migrate to the negative electrode, and the chloride anion to migrate to the positive electrode.

At higher concentrations the chloride anion is known to have a deleterious effect on the positive electrode, but this not appear to be the case in the present invention. On reaching the positive electrode, the relatively few chloride ions are believed to convert into chlorine gas, which seems to disappear without any trace. No deleterious effect has been detected.

In contrast, the effect of the migrated cations on the surface of the negative electrode is significant and is of considerable benefit to the operation of electrochemical cells, for example, lead-acid battery cells.

The cation belongs to a group of amines termed quaternary ammonium. A quaternary ammonium ion is a powerful surfactant due to its long non-polar hydrocarbon tail and polar head. Although the tail is hydrophobic, the head is hydrophilic and will dissolve in water in all proportions, wherein it readily attaches to negatively charged particulates and surfaces.

The positive charge of the cation is carried by a single pentavalent nitrogen atom residing in the head, causing the cation to be attracted head first onto the surface of the negative electrode. In this process, the tail is left jutting out, although it need not necessarily be straight, but can be rolled into a ball, or indeed any intermediate shape. The tail is not static, and in groups tails are able to take up positions relative to each other so as to balance out and minimize the force of repulsion between them.

N-alkyl dimethyl benzyl ammonium chloride, in common with other surfactants, can provide a stable interface between water and air, and as a consequence tends to promote foaming. This property is used to advantage in the preferred embodiment of the present invention. Once firmly attached by their heads, the protruding tails are able to attract and to impede the flow away from the negative electrode surface of some of the hydrogen gas that is evolved in the course of operation of electrochemical cells, such as lead-acid battery cells. Gas that is attracted to the tails of the free cations likely contributes to limited conventional foaming.

Is has been ascertained that the effect on the negative electrode, as described, is not limited specifically to n-alkyl dimethyl benzyl ammonium chloride. Indeed, it can evoke through the addition of small quantities of other substances, to a greater or lesser degree, depending on their hydrophilicity and hydrophobicity and conformity with requisite geometric aspects at molecular level. Some other non-ionising and anionic additives such as aliphatic and cycloaliphatic amines, optionally in combination with aromatic groups, quaternary ammonium compounds, sulphosuccinic compounds, naphthenic acids and their amine salts, esters of higher polycarboxylic acids, as well as a variety of compounds containing elements of the fifth and sixth periodic groups such as nitrogen, oxygen and sulphur, as well as heterocyclic compounds including pyridine and quinoline have also provided encouraging results. Ureas, thioureas, mercapatans, alhehides, ketones and organic acids also find application.

Importantly, hydrogen ions must be able to migrate to the negative electrode in order to sustain the evolution of hydrogen gas. However, any impediment to the migration of hydrogen ions results in a reduction in the evolution of hydrogen gas. The process simply self-adjusts, thereby maintaining a balance.

In order to determine whether or not an additive of the invention has an effect on the performance of a battery during discharging and recharging, the following comparative example was carried out, the results of which are depicted graphically in FIGS. 4 and 5.

EXAMPLE 5

Two 100 A-H golf-cart batteries were deep cycled to ascertain the effect of the additive on the actual process of battery operation with respect to discharging and recharging phases, the first battery receiving no additive and the second battery receiving 200 mg/l of an n-alkyl dimethyl benzyl ammonium chloride additive.

After the two batteries had been examined and were found to be free of any defects, they were placed on test according to Battery Council International Deep Cycling Battery Test Procedure (5/93). The tests were carried out at room temperature. A charging current of 30 A was applied to a voltage limit of 2.55 volt per cell, and until 130 percent of the discharge capacity was returned.

Discharge was at 75 A down to 1.75 volts per cell. The batteries were rested for four hours before commencing the next cycle. The tests were conducted in conjunction with Bitrode LCN System Test Modules with precision programmable charges and discharges controlled by means of P C programs written for the procedure.

It can be seen by way of comparison of the results set out graphically in FIGS. 4 and 5 that the performance of the additive battery (FIG. 5) was marginally superior to the performance of the non-additive battery (FIG. 4). This shows that the additive does not interfere with the charging and discharging currents, the so-called process currents, in any way. It is thus only the so-called electrolysis current that is reduced above the potential threshold of the battery.

Figure 6:
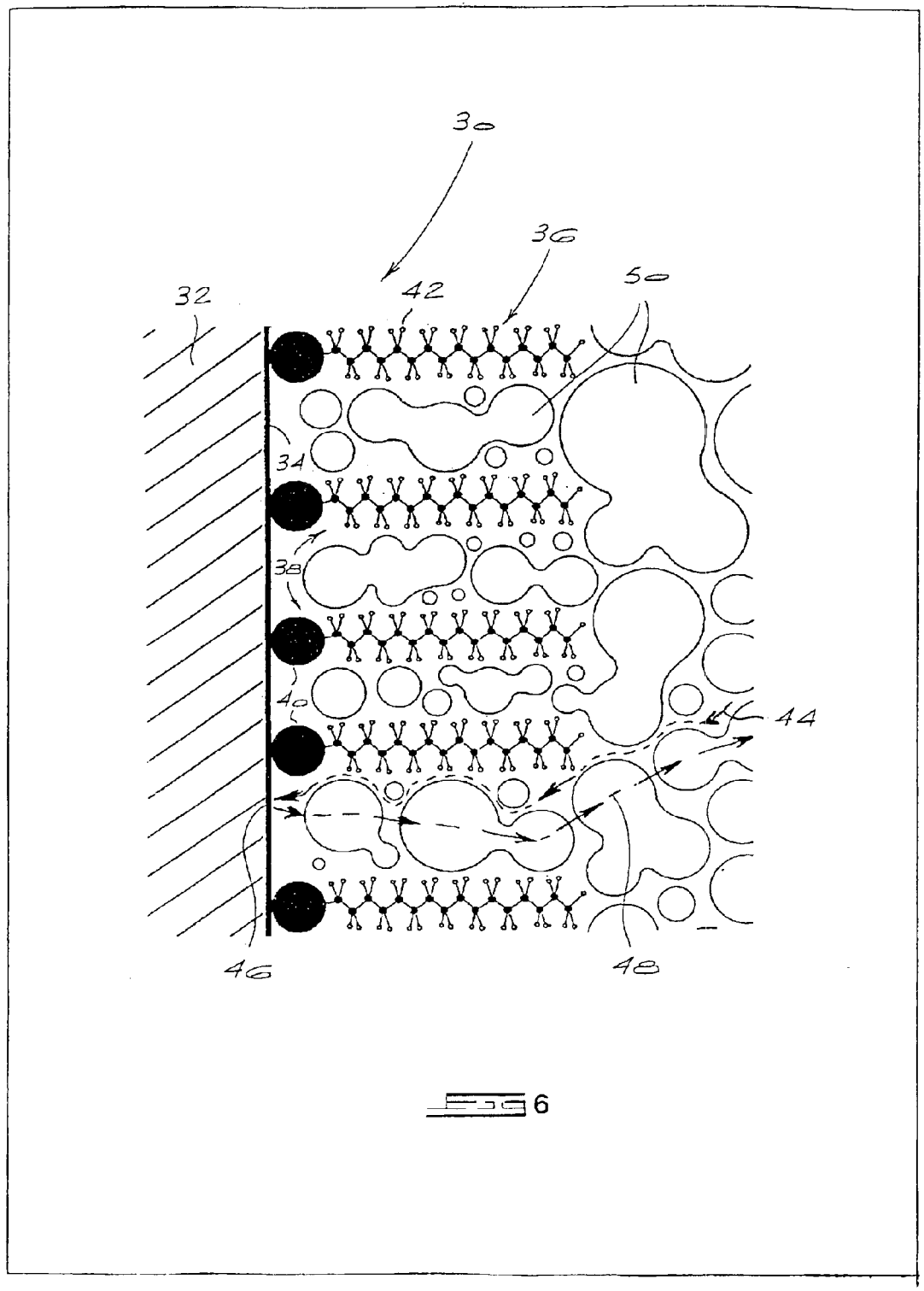
FIG. 6 is a schematic sectional view of a portion of a negative electrode of an electrochemical cell in contact with an additive of the invention.

A segment of an electrochemical cell of a type used in the aforegoing examples is illustrated in FIG. 6. Specifically, FIG. 6 shows a microscopic schematic representation of a section 30 of a negative electrode 32 as well as an associated surface 34 and adjacent miniscular portion of an electrolyte 36. Attached to the surface 34 at irregular intervals are shown five quaternary ammoniums 38, each comprising a hydrophilic head 40 and a hydrophobic tail 42. By way of example, in a lead-acid battery cell, the negative electrode 32 would be made of lead and the electrolyte 36 would comprise between 30 and 40 percent of sulphuric acid, by weight, in water. The structures of the individual quaternary ammoniums 38 are not drawn to scale, but are greatly exaggerated for sake of clarity. The chemical structure of the illustrated quaternary ammonium ion, comprising the head 40 and the tail 42 is approximated by the formula:

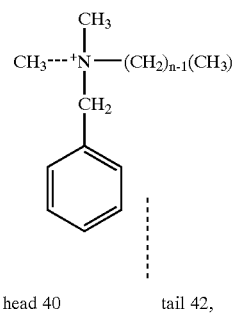

head 40        tail 42,

Wherein n represents the number of carbon atoms in the hydrocarbon tail, which is typically a mixture of C12, C14 and C16; and the shape of the quaternary ammonium ion is tetrahedral.

No attempt has been made in FIG. 6 to depict the shape of the head 40 other than schematically. The structure of the tail 42, on the other hand, is shown to be representative of the actual structure of the hydrocarbon tail, comprising a zig-zag chain of carbon atoms with outrigger hydrogen atoms. The tails are likely to have a different orientation, each to a different extent, to that which is shown.

Hydrogen ions may be assumed as migrating towards the surface 34 of the electrode 32 along a tortuous path 44, eventually reaching the surface 34 in area 46, whereupon the hydrogen ions are converted into hydrogen gas, which travels away from the surface 34 along a route 48.

The evolving hydrogen gas 50 is represented by irregularly shaped interlinking "balloons", some of which are interconnected in other planes not shown, and therefore appear free of each other.

The illustration is intended to exemplify only the rudiments of the presence and effect of an impediment medium by way of schematic representation, and as such, the depiction will differ in important respects to the actual situation which prevails in an electrochemical cell.

In the absence of quaternary ammoniums, the migration of hydrogen ions proceeds at a specific rate determined by a variety of factors particular to the electrochemical cell. However, in the presence of an effective concentration of quaternary ammoniums the migration is attenuated significantly through the interaction described above. The results obtained in the aforegoing examples, as well as other tests performed on larger 100 ampere-hour rated battery cells over several hundred consecutive charge-discharge cycles, have indicated that the impediment medium is active during a period of operation that in lead-acid battery cells, by way of example, corresponds to a gassing phase, which follows the completion of charging reactions within the cell upon continued application of charging energy to the cell. The impediment medium is substantially inactive during the periods of operation constituting charging and discharging, when the call is accepting and delivering energy, respectively.

The effect of the impediment medium, as has been observed where a battery charging apparatus is delivering electrical energy to a battery at a constant voltage, is to cause an apparent decrease in the charging current.

The effect of the impediment medium, as has been observed in a situation in which a battery charging apparatus is delivering electrical energy to a battery at constant current, also appears to cause an apparent increase in the charging voltage.

While both these effects are observed, interpretation reveals that there is no real increase in the cell potential, but that there is a decrease in the current. The effect is caused by an apparent lengthening or narrowing of the path available to the migration hydrogen ions, which implies that the mechanism at work is resistive in nature.

A creation of a resistive path at the surface of a negative electrode of an electrochemical cell through utilization of a gas which is in the process of evolving, provides outstanding operational benefits in respects of electrochemical cell usage.

Fortunately, it is a prerequisite for a condition to be established which will lead to the evolution of gas before the mechanism will be established that will have the effect of reducing the evolution of gas. There will thus exist no impediment to the performance of the electrochemical cell while being otherwise applied, for example, in charging and discharging procedures.

Significantly, the process of impediment herein described, which applies to hydrogen ions, can be utilised to impede other types of ions of which migration is occurring coincidental with migration of hydrogen ions, resulting thereby in the reduction in migration to the negative electrode of a variety of ions which might include lead, antimony, arsenic, tin, as well as others, in lead-acid battery cells, for example.

In other types of electrochemical cells, the migration of such ions as iron, zinc, chromium, copper, silver, as well as the ions of numerous other elements which are attached to the negative electrode, can similarly be attenuated.

This form of providing impediment to migration ions is likely to be efficient since hydrogen ions constitute the smallest ions, therefore all other ions will likely experience a greater degree of impediment than hydrogen.

While clearly suited for use in so-called flooded lead-acid battery cells, and in electrolyte and electroplating cells, where excessive water consumption is inconvenient and can lead to problems later on, the present invention is likely to be even better suited for use in sealed lead-acid batteries having no facility for water replenishment, or having facility for water regeneration.

Sealed lead-acid and value regulated sealed lead-acid batteries continue to suffer from a lower-than-anticipated life expectancy in the field. It appears that long term usage is often accompanied by a drying out effect, thus comprising the integrity of the battery.

Simple addition of a dosage of n-alkyl dimethyl benzyl ammonium chloride to the electrolyte such a battery at the time of manufacture may not always provide a solution to the drying out aspect, however.

It may be beneficial to combine the n-alkyl dimethyl benzyl ammonium cation with an anion other than chloride, in the case of sealed battery usage. It is necessary to dose electrochemical cells on an ongoing basis since the additive is consumed. A single dosage applied in direct contact with the electrolyte at the time of manufacture is likely to be ineffective by the time the battery is ready to be put into service in the normal course of events.

Slow release mechanisms in everyday use can be adapted for application in sealed lead-acid batteries, thereby provided a solution to this problem. These can typically include forms of impregnation, encapsulation and incorporation into other chemical substances of the additive presently under discussion, and bringing the controlled or restrained additive into suitable contact with the electrolyte or the negative electrode of the sealed batter unit.

The desired beneficial effect of an impediment medium in an electrochemical cell, as herein described, can also be evoked in the case of sealed lead-acid batteries through the addition of other substances possessing the requisite characteristics.

I claim:

1. A rechargeable electrochemical cell which is subjected to multiple charging cycles and discharging cycles, each charging cycle having a charging portion corresponding to a gassing charge where a gas is generated in the rechargeable electrochemical cell and a charging portion below the gassing charge, the rechargeable electrochemical cell comprising;
    opposed positive and negative electrodes;
    an aqueous electrolyte in ionic contact with the electrodes for supporting current flow therebetween; and,
    deactivatable impeding means, disposed in the electrolyte and having a constituent thereof bonded to the negative electrodes, for forming a barrier for impeding the gassing charge, the deactivatable impeding means activated by the charging portion corresponding to the gassing charge and being deactivated by the charging portion below the gassing charge such that when activated, the deactivatable impeding means impedes the gassing charge to limit gas generation in the rechargeable electrochemical cell, and when deactivated, the deactivatable impeding means has substantially no charge limiting effect, the deactivatable impeding means being deactivated and having substantially no effect during the discharge cycle.

2. The rechargeable electrochemical cell according to claim 1, wherein the deactivatable impeding means is a quaternary ammonium compound selected from the group consisting of alkyl dimethyl benzyl ammonium chloride, didecyldimethyl ammonium chloride, didecylmethyloxyethyl ammonium propionate, pyridine and quinoline.

3. The rechargeable electrochemical cell according to claim 1, wherein the deactivatable impeding means is a non-ionic compound selected from the group consisting of primary, secondary, tertiary, aliphatic and cycloaliphatic amines.

4. The rechargeable electrochemical cell according to claim 1, wherein the deactivatable impeding means is sodium dioctyl sulpho succinate.

5. The rechargeable electrochemical cell according to claim 1, wherein the deactivatable impeding means is an alkyl dimethyl benzyl ammonium chloride, the alkyl containing from 12 to 16 carbon atoms.

6. The rechargeable electrochemical cell according to claim 5, wherein the alkyl dimethyl benzyl ammonium chloride is present in the aqueous electrolyte at from about 5 mg/l to about 1500 mg/l.

7. The rechargeable electrochemical cell according to claim 5, wherein the alkyl dimethyl benzyl ammonium chloride is present in the aqueous electrolyte at from about 5 mg/l to about 75 mg/l.

8. The rechargeable electrochemical cell according to claim 1 wherein the deactivatable impeding means is soluble in the aqueous electrolyte.

9. The rechargeable electrochemical cell of claim 1 wherein the rechargeable electrochemical cell is a lead-acid battery.

10. The rechargeable electrochemical cell of claim 1 wherein the deactivatable impeding means contains elements from the fifth or sixth periodic groups.

11. A method for reducing water loss due to electrolysis of an aqueous acid electrolyte in a rechargeable electrochemical cell which is subjected to multiple charging cycles and discharging cycles, each charging cycle having a charging portion corresponding to a gassing charge where hydrogen gas is generated by electrolysis of the aqueous electrolyte and a charging portion below the gassing charge, the rechargeable electrochemical cell having opposed positive and negative electrodes, the aqueous electrolyte in ionic contact with the positive and negative electrodes for supporting currant flow therebetween, the method comprising:
    providing deactivatable impeding means disposed in the aqueous electrolyte, and bonding a constituent of the charge dependant impeding means to the negative electrodes, for forming a barrier to impede the gassing charge, the deactivatable impeding means being activated by the charging portion corresponding to the gassing charge and being deactivated by the charging cycle portion below the gassing charge, the deactivatable impeding means being deactivated and having substantially no effect during the discharge cycle; and,
    applying a charging cycle to the rechargeable electrochemical cell, activating the deactivatable impeding means when a gassing charge is attained, impeding the gassing charge to reduce water loss due to electrolysis.

12. A rechargeable electrochemical cell which is subjected to multiple charging cycles and discharging cycles, each charging cycle having a charging portion corresponding to a gassing charge where a gas is generated and a charging portion below the gassing charge, the rechargeable electrochemical cell comprising opposed positive and negative electrodes, an aqueous electrolyte in ionic contact with the electrodes for supporting current flow therebetween, and deactivatable impeding means disposed in the electrolyte and having a constituent thereof attached to the negative electrodes for impeding the gassing charge, the deactivatable impeding means being activated by the charging portion corresponding to the gassing charge to impede the gassing charge to reduce gas generation at the negative electrodes, and being deactivated at a charging cycle below the gassing charge to have substantially no charge limiting effect, the deactivatable impeding means when activated forming a barrier over a surface of the negative electrodes to impede ions attracted to the negative electrodes.

13. The rechargeable electrochemical cell according to claim 12, wherein the barrier further contains gas bubbles evolved from the negative electrode.

14. The rechargeable electrochemical cell according to claim 12 wherein the deactivatable impeding means have head portions attached to the negative electrode surfaces and tail portions extending into the electrolyte away from the head portions.

15. The rechargeable electrochemical cell according to claim 12, wherein the rechargeable electrochemical cell is a secondary battery cell.

16. The electrochemical cell according to claim 13, wherein a quantity of gas bubbles contained in the barrier correlates with a strength of impediment to ions attracted to the negative electrode.

17. The rechargeable electrochemical cell according to claim 12 wherein the barrier impedes ions selected from the group consisting of lead, antimony, arsenic, tin, iron, zinc, chromium, copper and silver ions.

18. The rechargeable electrochemical cell of claim 12 wherein the deactivatable impeding means contains elements from the fifth or sixth periodic groups.

19. A rechargeable electrochemical cell which is subjected to multiple charging cycles and discharging cycles, each charging cycle having a charging portion corresponding to a gassing charge where a gas is generated in the rechargeable electrochemical cell and a charging portion below the gassing charge, the rechargeable electrochemical cell comprising;

opposed positive and negative electrodes, a substantially constant current applied thereto by the charging cycle;

an aqueous electrolyte in ionic contact with the electrodes for supporting current flow therebetween; and, deactivatable impeding means, disposed in the electrolyte and having a constituent thereof bonded to the negative electrodes, for forming a barrier for impeding the gassing charge, the deactivatable impeding means activated by the charging portion corresponding to the gassing charge and being deactivated by the charging portion below the gassing charge such that when activated, the deactivatable impeding means impedes the gassing charge to limit gas generation in the rechargeable electrochemical cell and raises a voltage across the positive and negative electrodes, and when deactivated, the deactivatable impeding means has substantially no charge limiting effect, the deactivatable impeding means being deactivated and having substantially no effect during the discharge cycle.

20. A rechargeable electrochemical cell which is subjected to multiple charging cycles and discharging cycles, each charging cycle having a charging portion corresponding to a gassing charge where a gas is generated in the rechargeable electrochemical cell and a charging portion below the gassing charge, the rechargeable electrochemical cell comprising;

opposed positive and negative electrodes, a substantially constant voltage applied thereto by the charging cycle;

an aqueous electrolyte in ionic contact with the electrodes for supporting current flow therebetween; and, deactivatable impeding means having a constituent thereof bonded to the negative electrodes, for forming a barrier for impeding the gassing charge, the deactivatable impeding means activated by the charging portion corresponding to the gassing charge and being deactivated by the charging portion below the gassing charge such that when activated, the deactivatable impeding means impedes the gassing charge to limit gas generation in the rechargeable electrochemical cell and reduces a current between the positive and negative electrodes, and when deactivated, the deactivatable impeding means has substantially no charge limiting effect, the deactivatable impeding means being deactivated and having substantially no effect during the discharge cycle.

* * * * *